United States Patent [19]

Lay

[11] 4,284,157

[45] Aug. 18, 1981

[54] VEHICLE FOR THE PHYSICALLY HANDICAPPED

[76] Inventor: Larry D. Lay, 26078 Alger, Madison Heights, Mich. 48071

[21] Appl. No.: 965,573

[22] Filed: Dec. 1, 1978

[51] Int. Cl.³ .................... B60K 1/00

[52] U.S. Cl. .................... 180/65 R; 128/25 R; 128/80 R; 272/93; 272/114

[58] Field of Search .................... 280/257, 256, 253, 210, 280/200, 291; 180/65 R; 128/80 R, 80 G, 25 R; 272/73, 114, 96, 115

[56] References Cited

U.S. PATENT DOCUMENTS

| | | | |
|---|---|---|---|
| 1,386,346 | 8/1921 | Mack | 280/257 |
| 2,210,269 | 8/1940 | Taylor | 128/80 R |
| 2,641,249 | 6/1953 | Brockman | 128/25 R |
| 2,663,376 | 12/1953 | Curley | 280/259 X |
| 3,557,782 | 1/1971 | Wafer | 128/80 R |
| 3,964,786 | 6/1976 | Mashuda | 180/DIG. 3 |

*Primary Examiner*—John P. Silverstrim
*Attorney, Agent, or Firm*—Basile, Weintraub & Hanlon

[57] ABSTRACT

An amusement and exercising vehicle for physically handicapped persons is driven by a motor. Operational movement of the drive mechanism is translated into reciprocal movement of foot pedals. The foot pedals are provided with orthopedic braces for supporting the legs of the driver whereby the legs are supported for exercising movement by the motor during movement of the vehicle.

5 Claims, 4 Drawing Figures

FIG-1
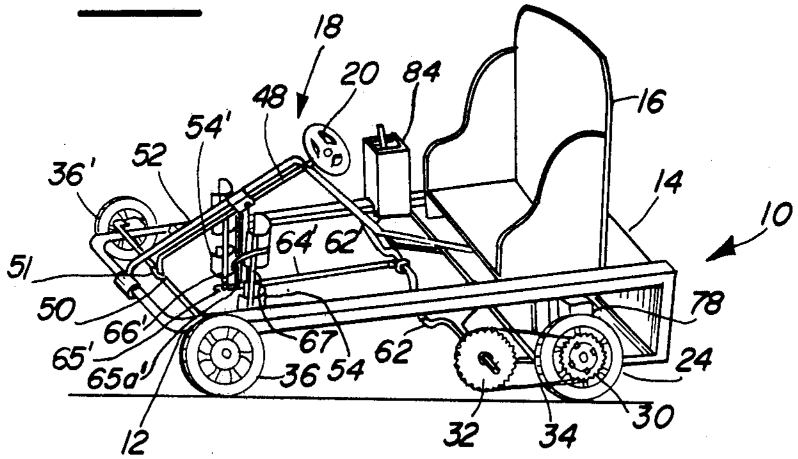
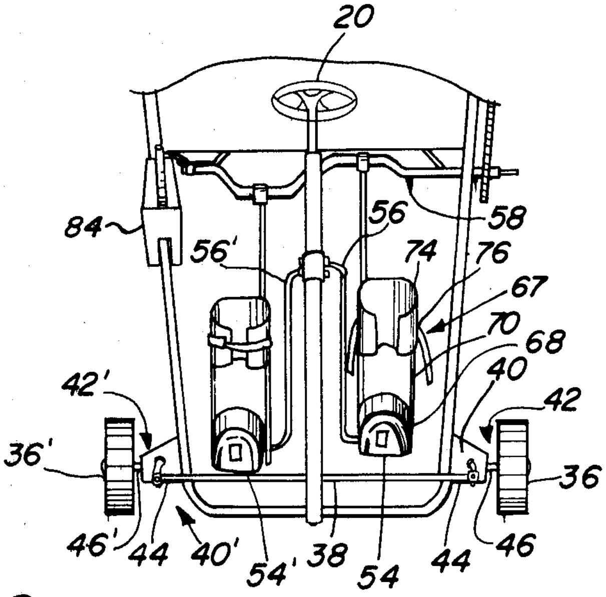
FIG-2

FIG-3
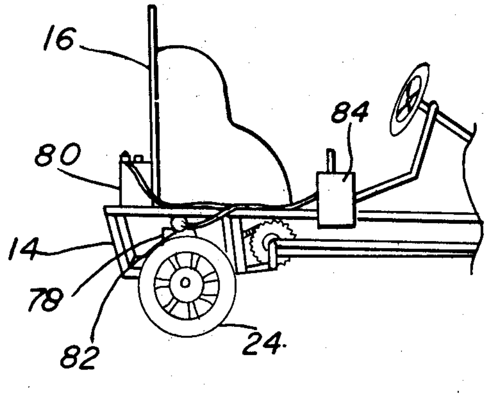
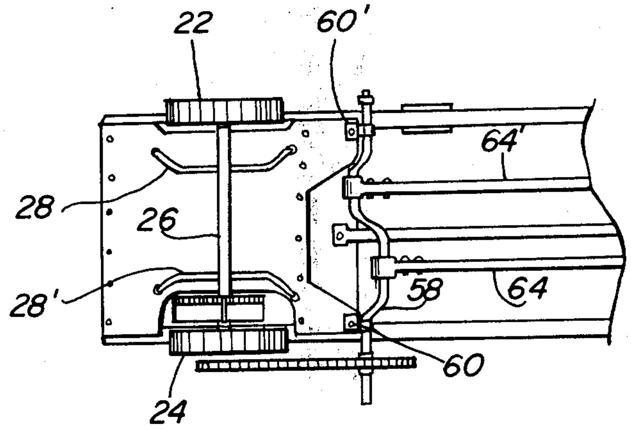
FIG-4

VEHICLE FOR THE PHYSICALLY HANDICAPPED

BACKGROUND OF THE INVENTION

I. Field of the Invention

The present invention pertains to exercise and locomotive devices. More particularly, the present invention pertains to vehicular exercise devices. Even more particularly, the present invention pertains to vehicle for the physically handicapped which enable non-ambulatory persons to exercise their legs.

II. Prior Art

Velocipedes have long been known wherein the reciprocal movement of treadles or foot pedals is translated to the rotary movement of wheels by means of an axle and crank. Vehicles of this general type are disclosed in U.S. Pat. Nos. 474,138 and 541,887, which comprise the most pertinent prior art of which applicant is aware.

Such devices afford the driver amusement and transportation as well as exercise. However, they require a considerable level of muscular strength for operation and, thus, are not suited for use by individuals lacking that minimum level of strength. For this reason, the therapeutic, muscle toning advantages, as well as the amusement and locomotive advantages of velocipedic devices have heretofore been unavailable to those having physical impairments of the lower extremities. Thus a great benefit would be realized if the velocipedic vehicle could be adapted for operation by persons having weakened legs. A further advantage would be gained by providing a velocipedic vehicle with a motor which would operate the drive means and the foot pedals associated therewith to achieve a reciprocal movement and valuable exercise for drivers incapable of achieving such movement independently. Thus, the present device would help to prevent the deterioration of muscles in non-ambulatory patients.

SUMMARY OF THE INVENTION

In accordance with the present invention there is provided a vehicle comprising a frame, a carriage portion having a seat mounted thereon, and front and rear wheels. At least one rear wheel is provided with drive means which is operated by the rotation of a drive axle which is provided with oppositely disposed cranks. The rotation of the drive axle is translated into reciprocal movement of foot supports or pedals via reach rods, each reach rod extending between a foot pedal and a crank. At least one foot pedal, and if required, both foot pedals are provided with an orthopedic brace which furnishes support to the leg of the driver.

The velocipede is provided with a motor which effects directly the rotation of the drive wheel. The rotation of the drive axle is translated into a reciprocal movement of the braced footpedals through the reach rods extending therebetween, thus providing exercise for the legs even where the driver is incapable of independent movement thereof.

BRIEF DESCRIPTION OF THE DRAWING

For a more complete understanding of the present invention, reference is made to the following detailed description and accompanying drawings wherein like reference numerals refer to like parts throughout the several views in which:

FIG. 1 is a perspective view of the present vehicle;

FIG. 2 is a partial, top plan view of the vehicle thereof;

FIG. 3 is a partial side view thereof; and

FIG. 4 is a partial bottom plan view thereof.

DESCRIPTION OF THE PREFERRED EMBODIMENT

Now and with reference to FIG. 1, a recreational and exercise vehicle, is illustrated generally at 10. The vehicle 10 comprises a frame 12 and a carriage portion 14 mounted thereon. The frame 12 is constructed from metal or any other suitably durable material. A seat 16 is mounted onto the carriage. The seat 16 is, preferably, provided with back and side supports to maximize safety and comfort of the driver.

The vehicle further comprises means for steering the vehicle indicated generally at 18, which may be operated by the driver by means of a steering wheel 20 in the known manner. It is to be understood that other suitable mechanical or motorized steering means may be employed within the scope of this invention.

The vehicle is provided with a plurality of wheels and, in the preferred embodiment, has two rear wheels (22,24) at the rear of the vehicle, adjacent the carriage portion 14. As best illustrated in FIG. 4, one wheel is mounted on each side of the carriage 14 by means of an axle 26 extending across the bottom of the carriage 14. The axle 26 is secured to the bottom of the carriage by any suitable means such as by being welded to mounting rods 28,28' provided on the carriage 14 or the like. At least one rear wheel, 24, is a driven wheel and is provided with a first sprocket 30 which cooperates with a second sprocket 32 through a chain 34 to achieve movement of the vehicle in a manner which will be explained more fully hereinbelow.

The vehicle 10 is further provided with at least one front wheel, although it is preferred that the vehicle be equipped with at least two front wheels for better stability. As illustrated in FIG. 2, front wheels, 36,36' are mounted on each side of the frame 12 by means of a tie rod 38. The tie rod 38 terminates at each end in a knuckle, indicated generally at 40,40' through which means the front wheels 36,36' are pivotally mounted. Each knuckle 40,40' comprises a radius arm 44,44', which is connected pivotally to the tie rod and a medial, vertical portion which extends through a mounting support 42,42' provided on the frame. Each knuckle 40,40' further comprises a substantially horizontal spindle, 46,46' upon which each front wheel 36,36' is mounted.

As best seen in FIG. 1, the steering means comprises a conventional pittman arm 48 which is mounted at one end to the steering wheel 20 and extends through an aperture 51 provided in a bracket 50, affixed to the tie rod 38 such that the rotation of the pittman arm 48 in response to the turning of the steering wheel 20 urges the arm 48 against the bracket 50 and the tie rod 38 turning the spindles 46,46' and the wheels 36,36' mounted thereto in the direction the steering wheel 20 is turned. It is to be appreciated that other well known steering devices, such as power steering or electronic directional selection may be incorporated into the present vehicle to permit operation thereof by persons having physical impairments which prevent their using manual steering means.

The steering wheel 20 is supported by a column 52. The support column 52 extends up from the front of the frame 12 and has an aperture adapted to receive the pittman arm 48 proximate the steering wheel 20, as shown in FIG. 1. The column 52 terminates at the carriage portion 14 and is secured thereto at any convenient point, such as under the seat 16.

Reciprocally movable foot supports or foot pedals 54,54′ which are deployed proximate the front of the frame and are pivotally suspended from the support column 52 by means of pivot rods 56,56′.

The reciprocal movement of the pedals is achieved through a rotational movement of the driving means associated with the rear driven wheel 24. As indicated hereinbefore, the driven wheel 24 is provided with a first sprocket 30 which is connected to a second sprocket 32 through a chain 34. The second sprocket 32 is mounted to the vehicle in the same plane as the first sprocket 30 by means of a crank axle 58 which is secured to the vehicle proximate the driven wheel 24. The axle may be secured to the carriage 14 by means of a mounting bracket 60,60′ as shown in FIG. 4.

The crank axle 58 is provided with a pair of opposed cranks 62,62′ each crank being connected to a foot pedal by means of a reach rod, 64,64′. Each reach rod 64,64′ has a spindle portion 66,66′ which extends through an aperture 65,65′ provided in the reach rod 64,64′ and has a foot pedal 54,54′ mounted thereto. The reciprocal movement of the foot pedals 54,54′ is translated from the cranks 62,62′ through the reach rods 64,64′ via rotation of the crank axle 58.

As noted hereinbefore, the present vehicle is particularly adapted for use by persons whose lower extremities lack sufficient strength to operate vehicles of this type. Thus, a foot pedal for a disabled or weakened leg is provided with an orthopedic brace, generally indicated at 67. Although it is understood that either one or both foot pedals may be provided with a brace, only one will be described as the manner of assembly is identical for either foot. The brace 67 is provided with a foot piece 68 which is mounted on the pedal 54,54′ and with vertical leg support 70. The brace further comprises a calf support 74 which is secured to the drivers leg by means of a strap 76. The brace 67 is secured to the pivot rod 56,56′ at a point proximate the calf support 74. Thus, the strap 76 which secures the brace to the drivers leg may also serve to secure the brace to the pivot rod.

Additional benefits may be realized by providing a plurality of apertures 65′(a), some not shown, in the reach rods 64,64′. Thus, the distance of the foot pedals from the seat 16 may be adjusted by altering the position of the spindle 66 upon which the foot pedal is mounted along the length of the reach rod. Moreover, additional thigh supports, (not shown), may be added to the brace where required. In this manner, the braces are secured to the foot pedals and the pivot rods in order that the weakened leg is supported in applying force to the foot pedals to achieve movement of the vehicle.

In accordance herewith a drive motor 78 is mounted onto the vehicle and is employed to drive the wheel 24, and, thus, the crank axle 58.

As best seen in FIG. 3 and FIG. 4, a drive motor 78 is mounted on the carriage 14 proximate the driven wheel 24. The motor may be of any suitable type such as a conventional, battery powered electric motor. As shown in FIG. 3, the battery 80 may be mounted directly to the carriage 14 at any convenient location and electrically connected to the motor 78. A gear reducer 82 having an input shaft and an output shaft (not shown) is mounted on the carriage, the input shaft being rotatably connected to the drive motor 78. The drive wheel 24 is mounted to the output shaft. It is intended that the driver operate the vehicle by means of a conventional transmission box 84, electrically connected to the motor 78 and having forward, reverse and neutral positions.

When it is desired to operate the vehicle by means of the motor, the transmission is brought into forward or reverse position and the drive wheel is rotated accordingly, thereby moving the vehicle. The first sprocket 30 associated with the driven wheel 24 rotates therewith and the rotation of the first sprocket 30 is translated to the second sprocket 32 through the chain. The rotation of the second sprocket causes the crank axle 58 on which it is mounted to rotate, which rotation is translated to the foot pedals, 54,54′ by means of the reach rods, 64,64′ causing the reciprocal movement thereof. Thus, the motorized operation of the vehicle is translated back to achieve the reciprocal movement of the brace foot pedals, and the desired exercise of the leg muscles where the driver is incapable of achieving such movement himself.

Having thus described the invention, what is claimed is:

1. A vehicle for a physically handicapped person comprising:
- a frame;
- a plurality of ground engaging wheels mounted on said frame;
- means for steerably controlling at least one of said plurality of wheels by a physically handicapped person;
- means for driving said vehicle, said driving means including:
  - a source of power,
  - a motor connected to said source of power, and
  - means for drivingly connecting said motor to at least one of said plurality of wheels;
  - at least one rod having one end portion pivotally mounted to said frame for reciprocal movement;
  - a foot support mounted on the other end portion of said rod;
  - an orthopedic brace including:
    - a foot piece mounted on said foot support,
    - a calf support,
    - a vertical leg support interconnecting said foot piece and said calf support, and
    - means for connecting said vertical leg support to said rod proximate said calf support; and
- means for drivingly interconnecting said drivingly connecting means and said rod whereby at least one leg of a physically handicapped person is exercised by reciprocal movement of said rod while said vehicle is being driven.

2. The vehicle of claim 1 wherein said source of power comprises a battery, said motor comprises an electric motor connected to said battery, and said drivingly connecting means comprises a transmission box and a gear reducer.

3. The vehicle of claim 1 which further comprises:
a battery, the battery defining the source of power.

4. The vehicle of claim 1 which further comprises:
a transmission box electrically connected to the motor, the transmission box having at least forward, reverse and neutral positions.

5. The vehicle of claim 1 which further comprises:
a second rod having one end portion pivotally mounted to said frame for reciprocal movement; a second foot support mounted on the other end portion of said second rod; and a second orthopedic brace connected to said second rod and said second foot support.

* * * * *